(12) United States Patent
Gizaw et al.

(10) Patent No.: US 7,750,522 B2
(45) Date of Patent: Jul. 6, 2010

(54) SLOW-SPEED DIRECT-DRIVE GENERATOR

(75) Inventors: Daniel Gizaw, Belleville, MI (US);
David M. Erdman, Fort Wayne, IN (US); Joseph E. Miller, Fort Wayne, IN (US); Girma Desta, Suwanee, GA (US)

(73) Assignee: Danotek Motion Technologies, Ann Arbor, MI (US)

( * ) Notice: Subject to any disclaimer, the term of this patent is extended or adjusted under 35 U.S.C. 154(b) by 88 days.

(21) Appl. No.: 11/779,825

(22) Filed: Jul. 18, 2007

(65) Prior Publication Data

US 2008/0036215 A1    Feb. 14, 2008

Related U.S. Application Data

(60) Provisional application No. 60/831,510, filed on Jul. 18, 2006.

(51) Int. Cl.
*H02K 21/12* (2006.01)

(52) U.S. Cl. .............. 310/156.01; 310/156.47; 310/154.01

(58) Field of Classification Search .......... 310/154, 310/156, 156.01; H02K 21/12
See application file for complete search history.

(56) References Cited

U.S. PATENT DOCUMENTS

| | | | |
|---|---|---|---|
| 2,146,588 A * | 2/1939 | Merrill | 310/156.18 |
| 3,513,942 A | 5/1970 | Sato | |
| 3,911,300 A | 10/1975 | Lebkuchner | |
| 3,955,112 A | 5/1976 | Sell | |
| 5,290,416 A * | 3/1994 | Tong et al. | 204/298.16 |
| 5,490,319 A | 2/1996 | Nakamura et al. | |
| 5,532,532 A | 7/1996 | DeVault et al. | |
| 6,175,173 B1 | 1/2001 | Stephan et al. | |
| 6,229,240 B1 | 5/2001 | Kech et al. | |
| 6,365,998 B1 | 4/2002 | Kech et al. | |
| 6,433,448 B1 | 8/2002 | Hatton | |
| 6,717,323 B1 * | 4/2004 | Soghomonian et al. | 310/254.1 |
| 6,727,629 B1 * | 4/2004 | Soghomonian et al. | 310/254.1 |
| 6,727,630 B1 * | 4/2004 | Maslov et al. | 310/254.1 |
| 7,339,289 B2 * | 3/2008 | Wang et al. | 310/12.18 |
| 2002/0163270 A1 * | 11/2002 | Almada | 310/156.47 |
| 2003/0147739 A1 * | 8/2003 | Crinion | 415/4.3 |
| 2004/0251762 A1 * | 12/2004 | Regazzi et al. | 310/156.47 |
| 2006/0049699 A1 * | 3/2006 | Wang et al. | 310/12 |

FOREIGN PATENT DOCUMENTS

| | | |
|---|---|---|
| DE | 19824345 A1 | 12/1999 |
| EP | 0993097 A2 | 4/2000 |
| JP | 03237292 | 10/1991 |

* cited by examiner

*Primary Examiner*—Quyen Leung
*Assistant Examiner*—John K Kim
(74) *Attorney, Agent, or Firm*—Butzel Long

(57) ABSTRACT

A direct-drive generator and assembly procedure for that generator include a permanent magnet assembly that is partitioned and assembled piece-by-piece after the rotor and stator have been attached.

The magnets are attached to a plate in columns, and adjacent columns have a N-S orientation. The air gap between the rotor and stator is variable, and application of an input torque produces a first cogging torque in a first direction due to the variable air gap that offsets a second cogging torque in a second opposite direction.

7 Claims, 3 Drawing Sheets

FIG - 3
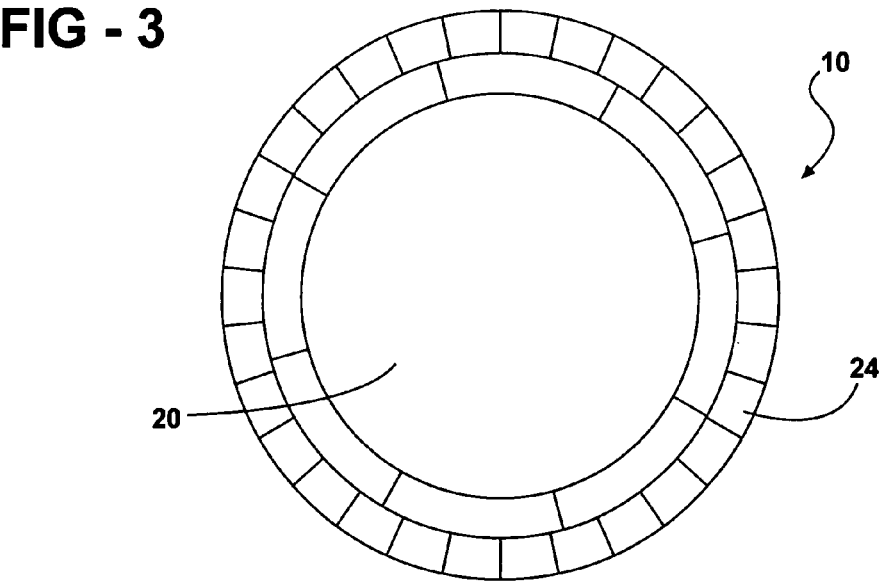
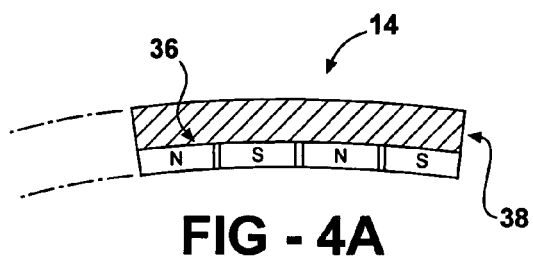
FIG - 4A
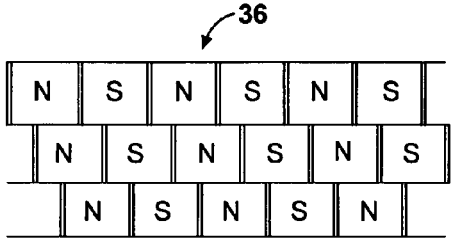
FIG - 4B
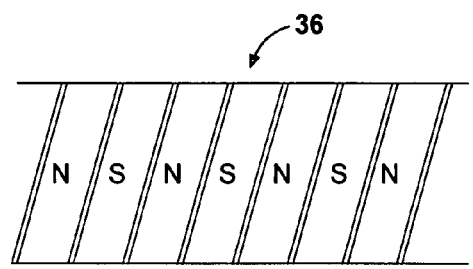
FIG - 4C
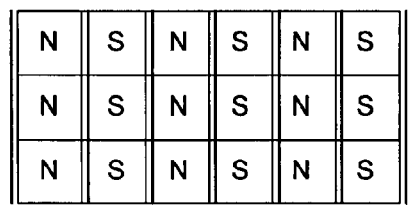
FIG - 4D

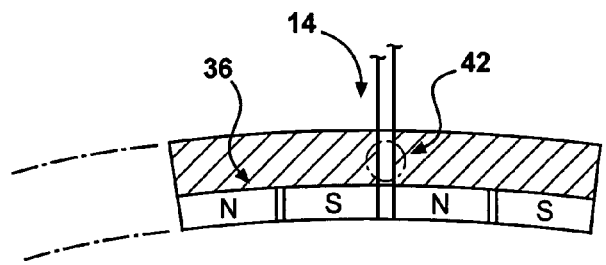
FIG - 5A
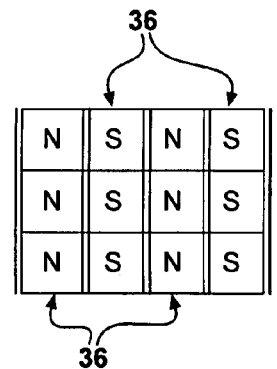
FIG - 5B
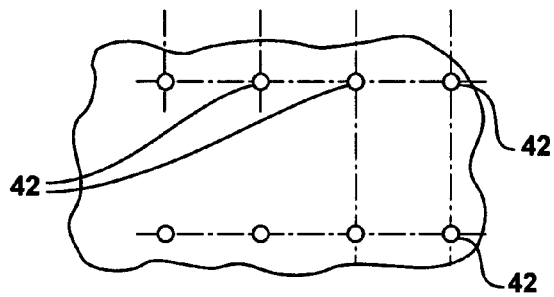
FIG - 5C
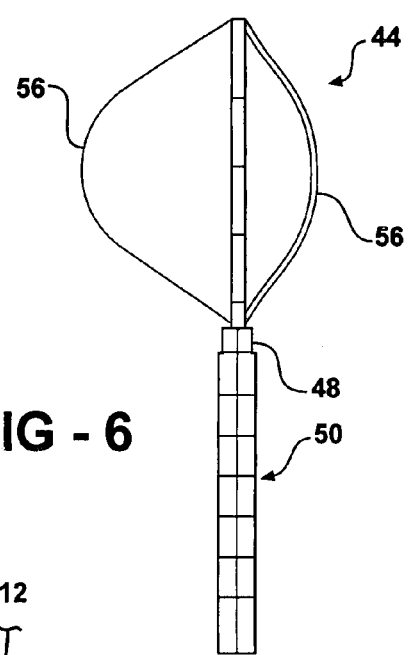
FIG - 6
FIG - 7
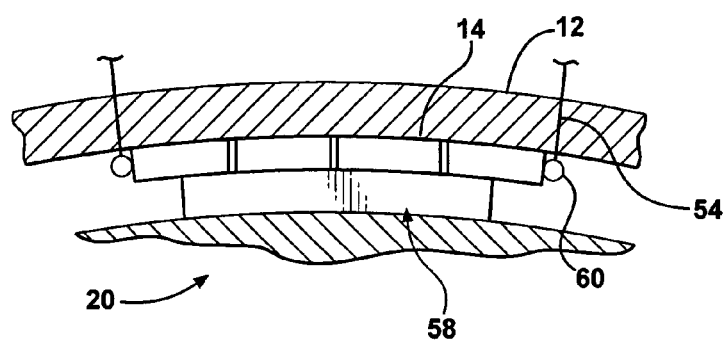

SLOW-SPEED DIRECT-DRIVE GENERATOR

RELATED APPLICATIONS

This application claims priority of U.S. Provisional Patent Application Ser. No. 60/831,510 filed Jul. 18, 2006, which is incorporated herein by reference.

BACKGROUND OF THE INVENTION

Brushless permanent-magnet (PM) motors and generators are commonly used small devices and/or devices that operate at high-speed. They are less commonly utilized in slow speed applications due to the assembly difficulties associated with maneuvering a large magnet and because of the difficulty of eliminating enough cogging torque for slow-speed applications.

An example of a slow-speed application that has rarely used a brushless PM generator is wind power. Slow-speed operation often utilizes a gearbox to turn the generator at a higher speed. In addition to efficiency losses, the gearbox necessitates a larger structure to support the additional weight of the gearbox/generator assembly, Thus, there is a need in the art for a generator that includes a permanent magnet, and reduces cogging torque for use in slow-speed applications.

SUMMARY

This present disclosure relates to a slow-speed, large-scale generator and assembly procedure for that generator. The magnet is partitioned and assembled piece-by-piece after the rotor and stator have been attached. Guides are used to arrange the magnets so as to give skew to the overall magnet assembly. The shoes of the teeth of the stator have subteeth.

The direct drive generator makes manufacturing easier and has reduced cogging torque, to facilitate large-scale, slow-speed operation. The efficiency and thus reduced weight of the direct-drive improves the packagability of the generator, since the generator can be smaller in size, easier to construct and have fewer components.

DESCRIPTION OF THE DRAWINGS

The above, as well as other advantages of the present disclosure will become readily apparent to those skilled in the art from the following detailed description when considered in the light of the accompanying drawings in which:

FIG. 3 illustrates a stator lamination stack for the generator of FIG. 1.;

FIG. 4 illustrates a magnet assembly for the generator of FIG. 1.;

FIG. 5 illustrates a sectional view of a rotor mount for the generator of FIG. 1.;

FIG. 6 illustrates a generator disposed in a windmill; and

FIG. 7 illustrates a magnet assembly installation alignment for the generator of FIG. 1.

DESCRIPTION

Figure 1:
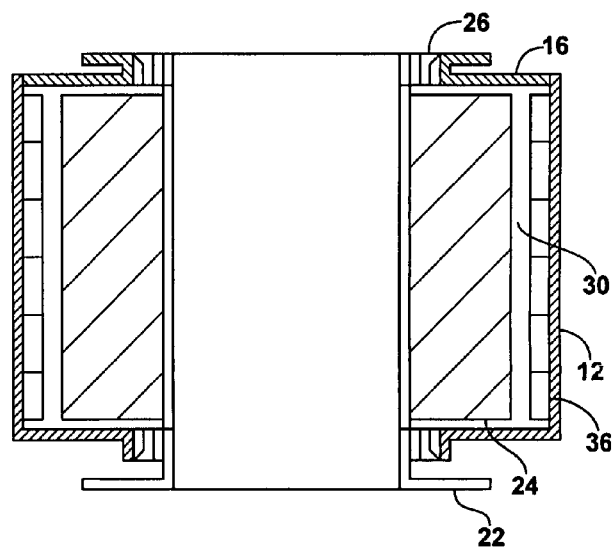
FIG. 1 illustrates a cutaway view of a generator.

FIG. 1 is a cross-sectional view of the generator. An outside rotor 10 includes a rotor mount 12, permanent-magnet assemblies 14 lining the inside of the rotor mount 12, and a top flange 16 rigidly connected to the top 18 of the rotor mount 12. An inside stator 20 includes a stator mount 22 and a stator lamination stack 24. The rotor 10 and stator 20 are rotatably connected by two bearings 26, one near the top 18 and the other near the bottom 28. The stator 20 is situated inside the rotor 10 so as to leave a small air gap 30 between the permanent magnets 14 and the stator lamination stack 24.

Figure 2A:
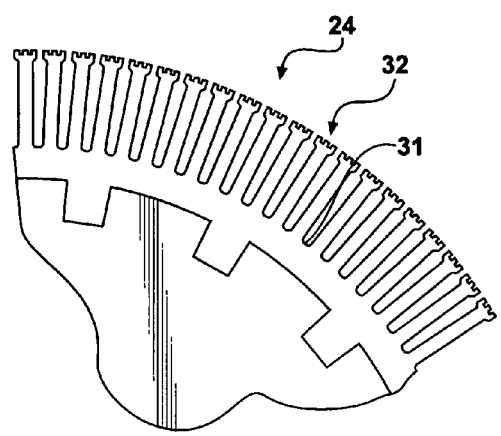
FIG. 2 illustrates an individual tooth for the generator of FIG. 1.
Figure 2B:
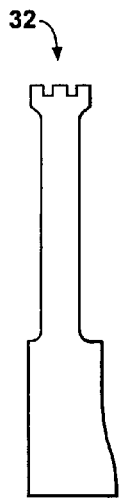
Figure 2C:
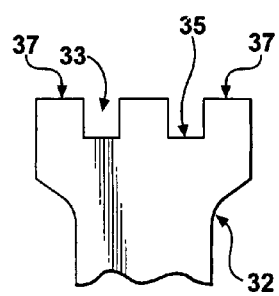

FIG. 2 shows a stator lamination stack 24 with teeth 32. The Detail A part of FIG. 2 shows an individual tooth 32 of the stator lamination stack 24. There are approximately 144 teeth around the circumference of the stator lamination stack 24. The space between the teeth is known as a slot opening 31. Each tooth 32 contains a shoe 34 with three or so subteeth or protrusions 35, 37 facing the air gap 30, which improve flux flow and reduce cogging torque. Detail B of FIG. 2 shows an individual tooth 32, a center protrusion or subtooth 35, and two protrusions to the side of the center protrusion, 37. Between the protrusions there is are notches 33.

When a permanent magnet rotor turns in an airgap a cogging torque is generated due to variations in the air gap 30. This generates a torque due to variation of magnetic reluctance which causes a cogging of the shaft torque. The major variation in airgap 30 is due to the slot opening 31 between the teeth 32 so that the winding may be put around the teeth. The cogging torque can be reduced by skewing the poles of the magnet. However, to reduce the cogging torque to acceptable levels by skewing alone the amount of skew may be so great the BEMF of the motor may be reduced or the wave shape of the BEMF of the motor may be compromised thus reducing the performance of the motor.

The effect of cogging torque can also be reduced by introducing deliberate variations in the airgap 30 of the motor which generate a reluctance torque which is opposite of the reluctance torque generated by the slot opening 31.

Introducing a particular ratio into the lamination can assist in providing deliberate variations in the airgap 30. For example, where the number of stator teeth is 1.5 times the number of rotor poles, such as 144 stator teeth and 96 magnetic poles on the rotor, this will provide variation in the airgap. The cogging due to the slot opening 31 can also be reduced by making the center protrusion 35 the same width as the slot opening 31. The notches 33 on either side of the center protrusion 35 would have a width of half the distance from the edge of the center protrusion 35 to the edge of the slot opening 31. The protrusions next to the slot opening 37 would have a width the same as the width of the notches 33.

As the rotor 10 is turned, while one pole of the magnet is seeing the slot opening 31 another magnetic pole of the rotor 10 is seeing the protrusion 35 in the center of another tooth 32. When the first magnetic pole on the rotor is transitioning from the slot opening 31 to the tooth 32, another magnetic pole on the rotor 10 is transitioning from a protrusion on the center of the tooth 35 to the notch 33 on the tooth 32. Every time a magnetic pole of the rotor is transitioning from a larger airgap to a smaller airgap another pole of the motor is transitioning from a smaller airgap to a larger airgap. While each magnetic pole of the rotor is producing cogging due to the variation of the reluctance of the airgap, half the magnetic poles are producing a torque in one direction while the other half of the magnetic rotor poles are producing a cogging torque in the opposite direction. The net result is a cancellation of the cogging torque.

FIG. 3 shows the stator lamination stack 24. It has a coil of electrically-conducting wire wound around the teeth 32. The stator lamination stack 24 shown from a top view in FIG. 3 is a schematic end view of the generator. The outer ring of segmented parts shown in FIG. 3 are the magnets 36 of the generator 48. FIG. 3 also shows that the rotor 10 is on the outside of the assembly and the stator 20 is on the inside. The center portion depicts the stator 20. The actual number of magnets 36 and the number of stator teeth 32 may vary.

FIG. 4 shows a magnet assembly 14. The magnets 36 are affixed to a curved plate 38, approximately 96 of which line the inside surface of the rotor mount. The magnets can be arranged in a linear arrangement so that the north and south magnets are perpendicular to one another in columns, as shown in FIG. 4D.

Alternatively, the rotor magnetic pole can also be skewed for additional reduction of cogging. There are at least two ways to skew the magnetic pole. One way, as shown in FIG. 4B is to stagger or displace the magnets 36 so that the north and south magnets do not line up exactly, resulting in a skewed magnetic pole. The degree to which the magnets 36 are staggered may vary and result in variations of skew to the magnetic pole. Another way to skew the magnetic pole is shown in FIG. 4C, where the magnets 36 are placed or created using magnetizing equipment in strips that are affixed at an angle relative to the interior of the plate 38 such that the magnets 36 are continuously skewed. As with the staggered magnetic skew, the continuous skew in FIG. 4C may be accomplished at a variety of angles to result in variations to the skew of the magnetic pole.

FIG. 5 shows a small section of the rotor mount 12. The permanent magnets 36 are affixed to plates 38 which are then bolted to the inside 40 of the rotor mount 12. As one travels up the side of the rotor mount 12, the bolt holes 42 are skewed slightly.

The skew of the magnets 36 from the holes 42 reduces the cogging torque and improves the wave shape of the voltage by reducing harmonic content.

FIG. 5A is an assembly of twelve magnets 36 referred to as a magnet-hub assembly 14. A total of ninety-six magnet-hub assemblies 14 are used in the complete rotor 10.

The magnets 36 are arranged in a N-S-N-S pattern along the circumferential direction of the hub and three magnets of like polarity are arranged lengthwise on the hub. Lengthwise is shown in FIG. 5A in the vertical direction while the circumferential direction is shown in the horizontal direction. Twelve magnets 36 are attached to a magnetic iron hub.

Ninety-six magnet-hub assemblies 14 are attached to rotor 10 with bolts using the holes 42 shown in the sheet in FIG. 5B. The lengthwise direction in FIG. 5B is shown horizontally while the circumferential direction is shown vertically.

Twenty-four magnet-hub assemblies 14 are first bolted to the rotor 10 in a circumferential direction using the first two rows of holes 42. Then twenty-four magnet-hub assemblies 14 are bolted to the rotor 10 in the circumferential direction using the next two rows of holes 42. The second row of holes 42 are staggered from the first set of holes 42 by 0.15625 radial degrees, or approximately 2.05 mm. Third and fourth sets of holes 42 are likewise staggered by the distance.

When the rotor 10 is finished along the lengthwise direction there are three magnets of the same polarity directly in line, and three more magnets directly in line with each other but staggered by approximately 2.05 mm from the first set of the magnets, with three more magnets in line with each other but staggered 4.1 mm from the second set of magnets and then three more magnets in line with each other but staggered 4.1 mm from the third set of magnets. This produces a staggered skew of the rotor magnets 36.

FIG. 6 shows an application of a device that utilizes the generator, which in this example is a windmill 44 of the "egg beater" design with an airfoil 56 connected to a direct-drive generator 48. The windmill 44 rests atop a tower 50 and it is understood that the generator assembly 48 can be located at any point along the tower 50, or multiple generators, possibly of different horsepower, can be distributed along the tower 50 in segments. As described above, the rotor 10 and stator 20 of the generator 48 can be inside out and still located at any point along the tower 50. The invention also may be used with wind turbines of other designs, including those with horizontal and vertical turbines.

FIG. 7 shows a rotor for a slow-speed generator. In building the generator, the rotor 10 without the magnet-hub assemblies 14 attached is placed over the stator 20. A Teflon spacer or plate 58 is placed next to the stator 20. The thickness of the plate is slightly less than the airgap 30 between the magnets 36 and the stator 20. The magnet-hub assembly 14 is pushed lengthwise in the space between the rotor 10 and the Teflon plate 58 until it is aligned with a pre-drilled hole 60 in the rotor 10. Guide poles 54 are used to position the magnet-hub assembly 14 circumferentially for proper alignment with the predrilled holes 60 in the rotor 10.

The magnet assemblies 14 are assembled by gluing or otherwise fixing the magnets 36 to the curved plate 38 (FIGS. 4 and 7); the magnets 36 are aligned such that they will be alternating polarity as one travels around the rotor 10. Alternatively, the magnets 36 are magnetized with magnetizing equipment to achieve the desired pattern of magnets with respect to the distribution of north and south poles.

The stator mount 22 has the lamination stacks 24 built around and affixed to it. The bearings 26 are also attached to the stator mount 22 by the inner rings 52, one bearing near the top 18 and the other near the bottom 28. The rotor 10, without the magnet assemblies, is also attached to the bearings 26.

Each magnet assembly 14 is attached to the rotor mount 12 individually. First, a curved Teflon or similar nonmagnetic material plate 38 is slid into the air gap 30, and two guide poles 54 are placed on either side of the location where the magnet assembly 14 will be placed. Next, the magnet assembly 14 is lowered to the bottom of the gap 30 created between the rotor mount 12, Teflon plate 38, and guide poles 54, all of which collectively hold the magnet assembly's radial and circumferential positions (see FIG. 6). Finally, the magnet assembly 14 is secured to the rotor, such as by bolting, gluing or applying another type of fastener. The process is repeated for each magnet assembly 14.

Finally, the top flange 16 is fixed to the rotor mount 12.

In operation, a slow-speed torque input (such as that provided by a windmill 44) is applied to the rotor 10 via the top flange 16. There does not need to be a change in gear ratio between a slow-speed input and the generator. The rotor rotates about the stator 20 on the bearings 26, and the motion of the magnets 36 passing the coiled lamination stack 24 produces electrical current in the coiled wires. The skew of the magnet alignment relative to the stator teeth reduces the cogging torque, as do the subteeth on the stator teeth.

The present generator has been described in an illustrative manner. It is understood that the terminology which has been used is intended to be in the nature of words of description, rather than of limitation. Many modifications and variations are possible in light of the above teachings. Therefore it should be noted that the generator can be practiced otherwise than as specifically illustrated and described without departing from its spirit or scope.

The invention claimed is:
1. A direct-drive generator assembly comprising:
   a rotor including a rotor mount having a top flange; and
   a plurality of permanent magnet assemblies lining an inside surface of said rotor mount, wherein each permanent magnet assembly includes a plurality of individual magnets arranged in rows and columns and attached to a plate, such that adjacent columns of magnets have alter- nating polarity to stagger magnetic skew of each column with respect to a magnetic pole of the rotor and the plate is secured to the rotor mount;

a stator having a stator mount and a stator lamination stack, and said stator is rotatably connected and mounted within said rotor, wherein said stator and rotor are separated by an air gap between said permanent magnet assembly and said stator lamination stack and the air gap is variable during rotation of said rotor;

wherein application of an input torque to the generator via said top flange of said rotor mount produces a first cogging torque in a first direction that is offset by a second cogging torque in a second opposite direction.

2. The direct-drive generator assembly of claim 1, wherein said permanent magnet assembly includes at least two adjacent columns of magnets each having alternating N-S polarity and each permanent magnet assembly fixed to said rotor mount is in a staggered alignment with the adjoining permanent magnet assembly to stagger magnetic skew of each column with respect to the magnetic pole of the rotor.

3. A direct drive generator assembly comprising:

a rotor having an inner wall and an outer wall, wherein the rotor is secured to a top flange;

a plurality of permanent magnet assemblies each secured to the inner wall of the rotor, wherein each permanent magnet assembly includes an array of individual magnets affixed to a curved plate in a linear arrangement of rows and column, so that a column of magnets having a magnetic pole with a first polarity is adjacent to a column of magnets having a magnetic pole with a second polarity and the first magnetic pole polarity is opposite the second magnetic pole polarity to stagger magnetic skew of each column with respect to a magnetic pole of the rotor;

a stator positioned within the rotor so that there is an air gap between the inner wall of the rotor and the stator and the air gap is variable during rotation of the rotor, wherein the stator includes a stator lamination stack facing the air gap, and application of an input torque to the rotor rotates the rotor in the variable air gap, such that a first cogging torque in a first direction by the corresponding column of magnets having a magnetic pole with the first polarity offsets a second opposite cogging torque in a second direction by the column of magnets having a magnetic pole with the second polarity.

4. The direct drive generator of claim 3 wherein the stator lamination stack includes a plurality of teeth facing the air gap, and a slot between adjoining teeth results in a variation in the air gap when an input torque is applied to the rotor.

5. The direct drive generator of claim 3 wherein the rotor includes a first layer of permanent magnet assemblies arranged on the inner surface of the rotor and an adjacent layer of permanent magnet assemblies, such that each column of magnets of the first layer is offset from each column of the adjacent layer to stagger the magnetic skew of each column.

6. The direct drive generator of claim 3 wherein the magnets are bolted to the plate.

7. The direct drive generator of claim 3 wherein the array is a 3 by 4 array of magnets.

* * * * *